Figure 6:
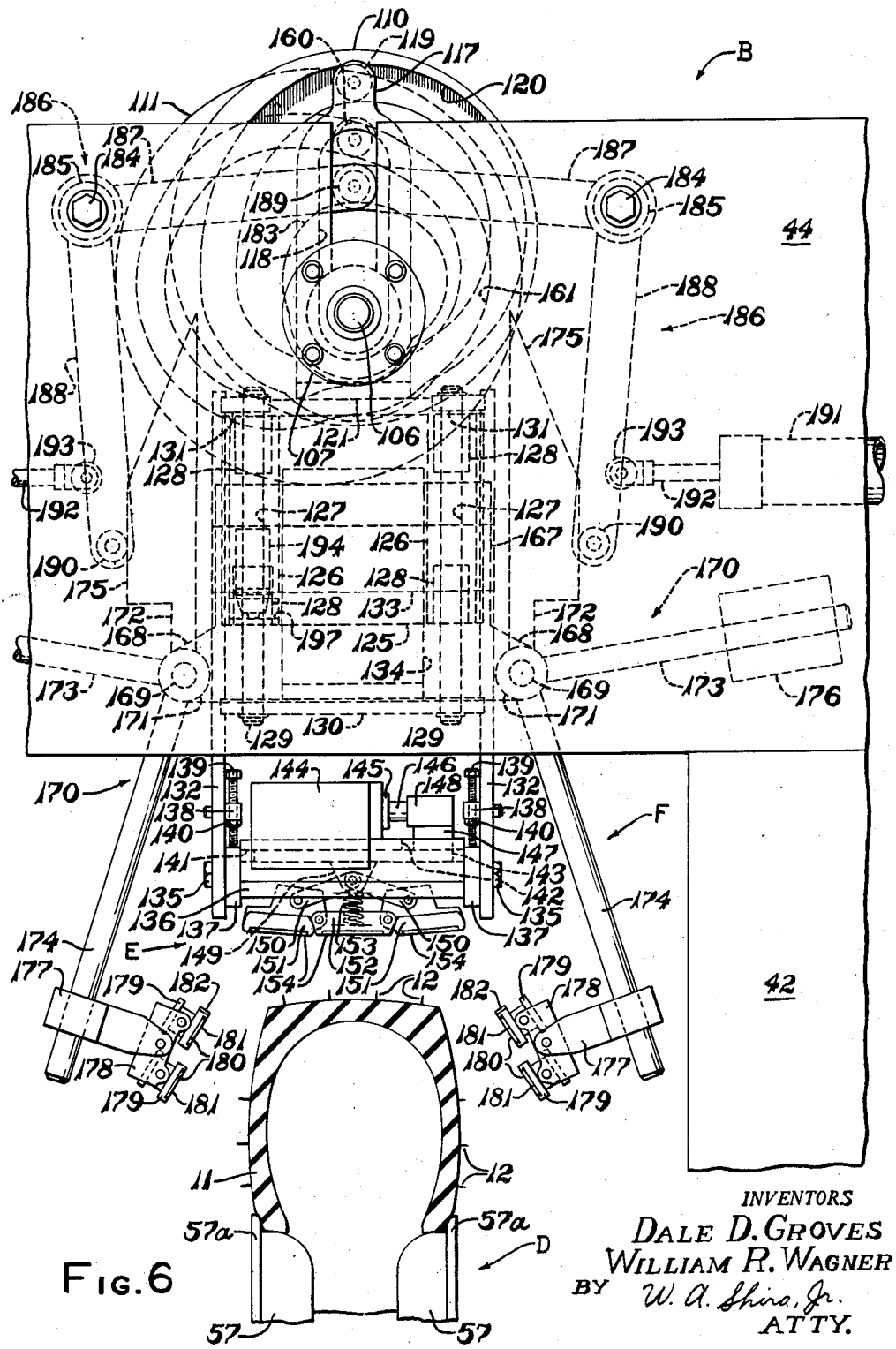

Jan. 29, 1963   D. D. GROVES ETAL   3,075,574
TIRE VENT TRIMMER
Filed Oct. 26, 1960   7 Sheets-Sheet 1
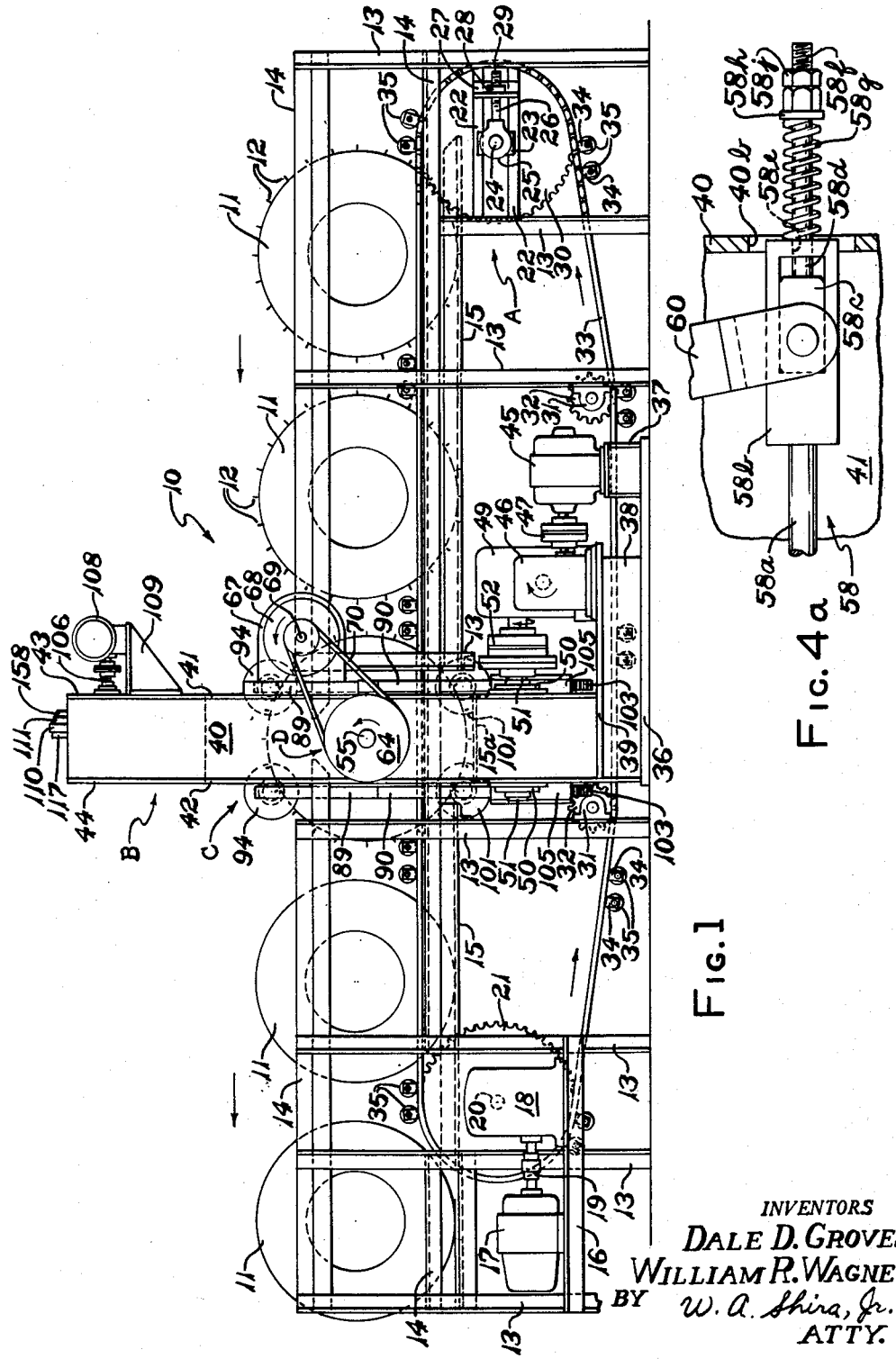
INVENTORS
DALE D. GROVES
WILLIAM R. WAGNER
BY W. A. Shira, Jr.
ATTY.

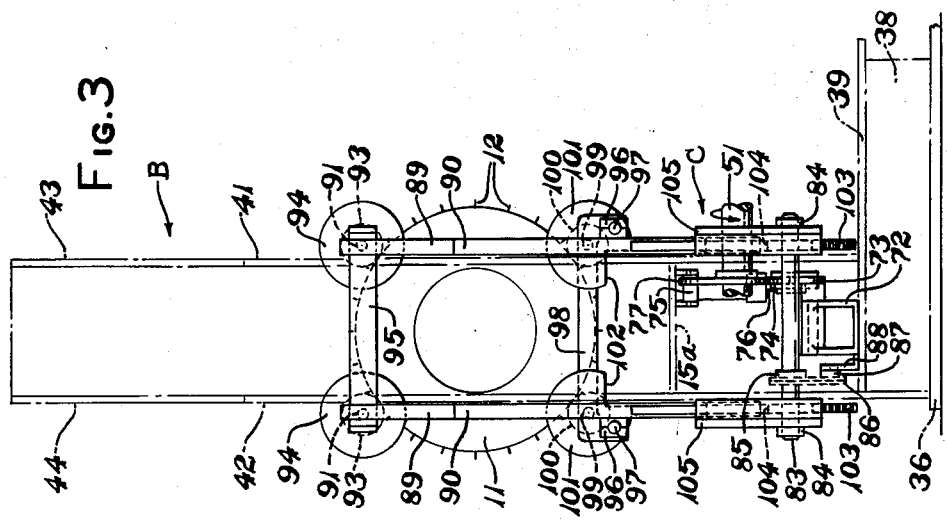

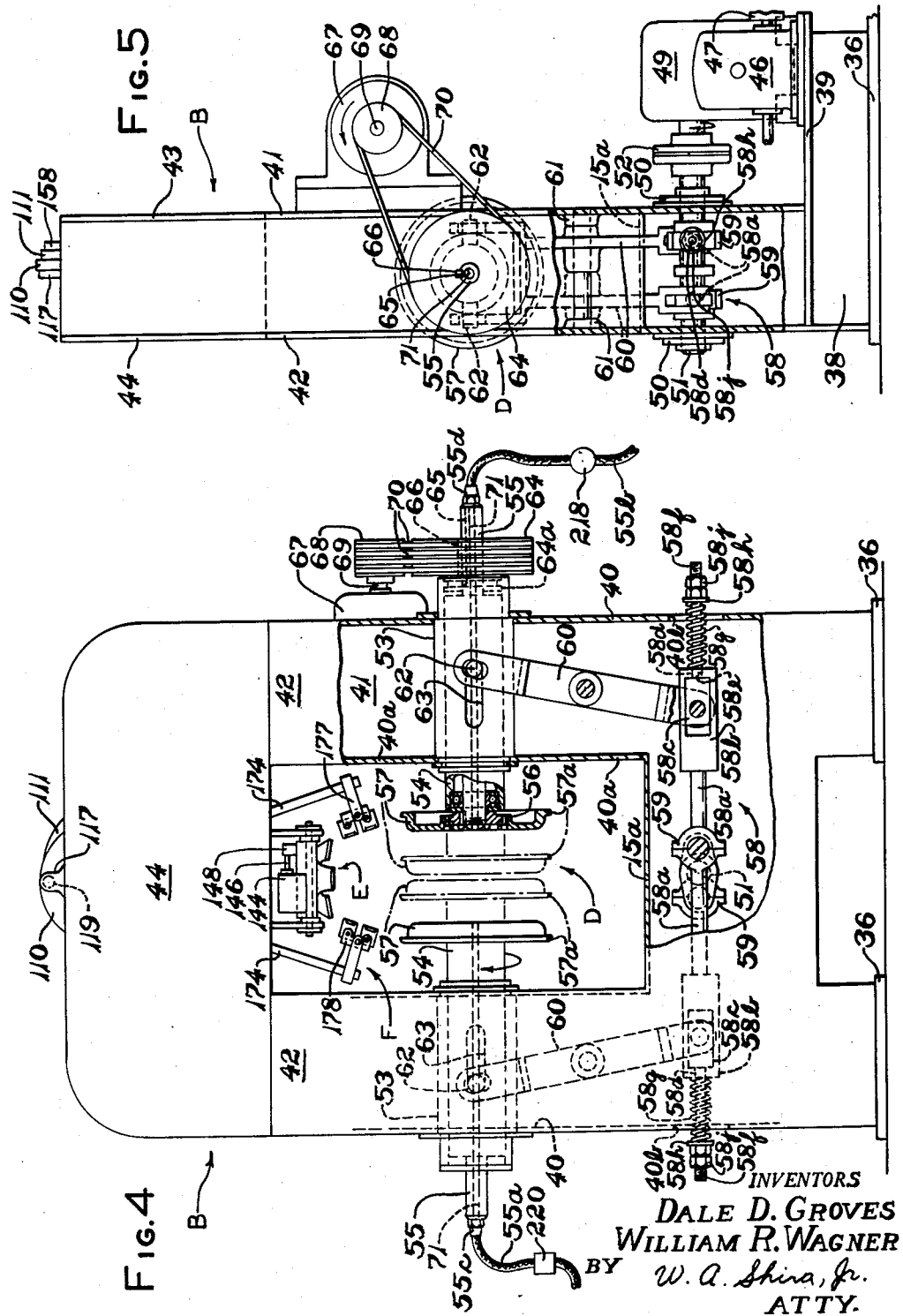

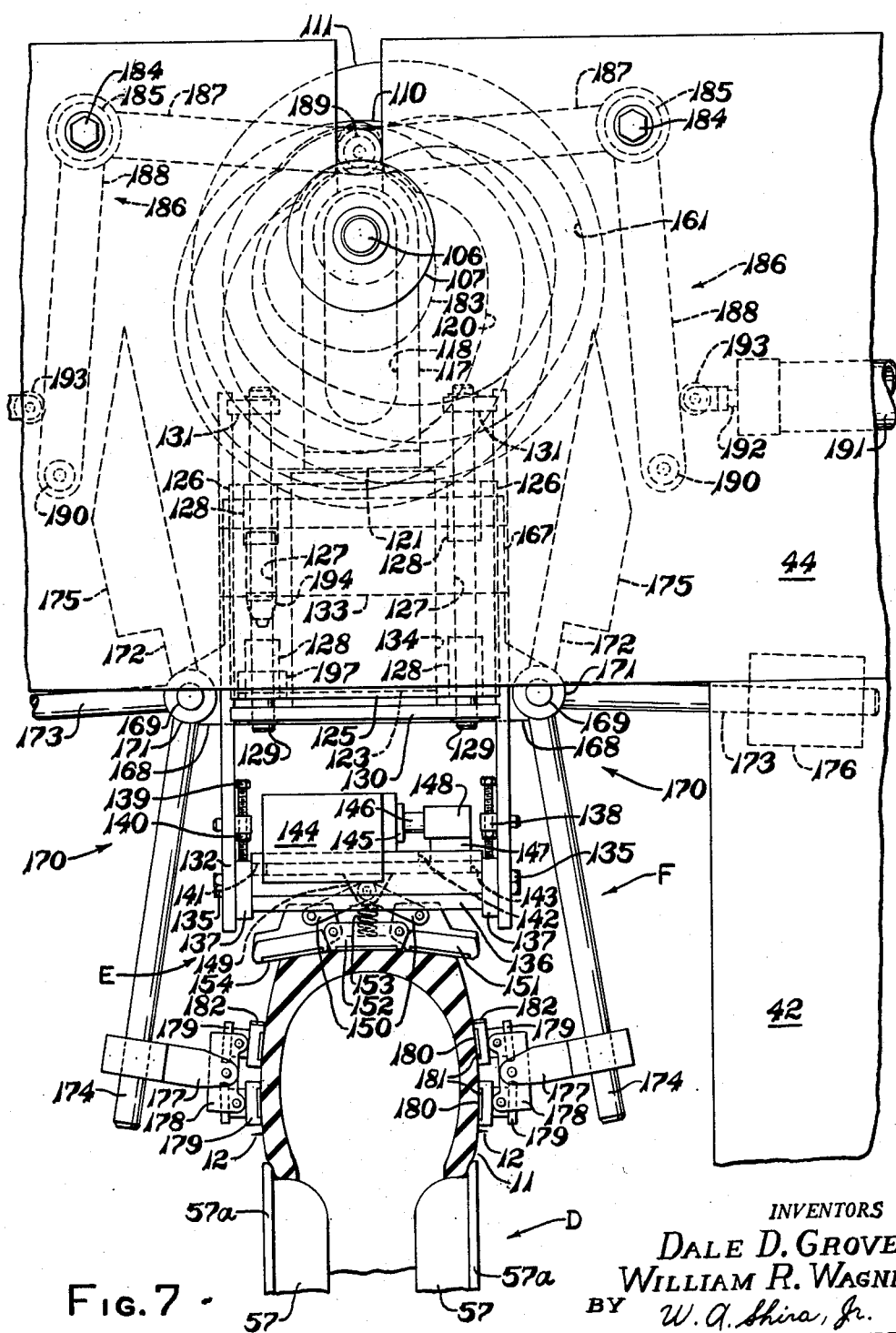

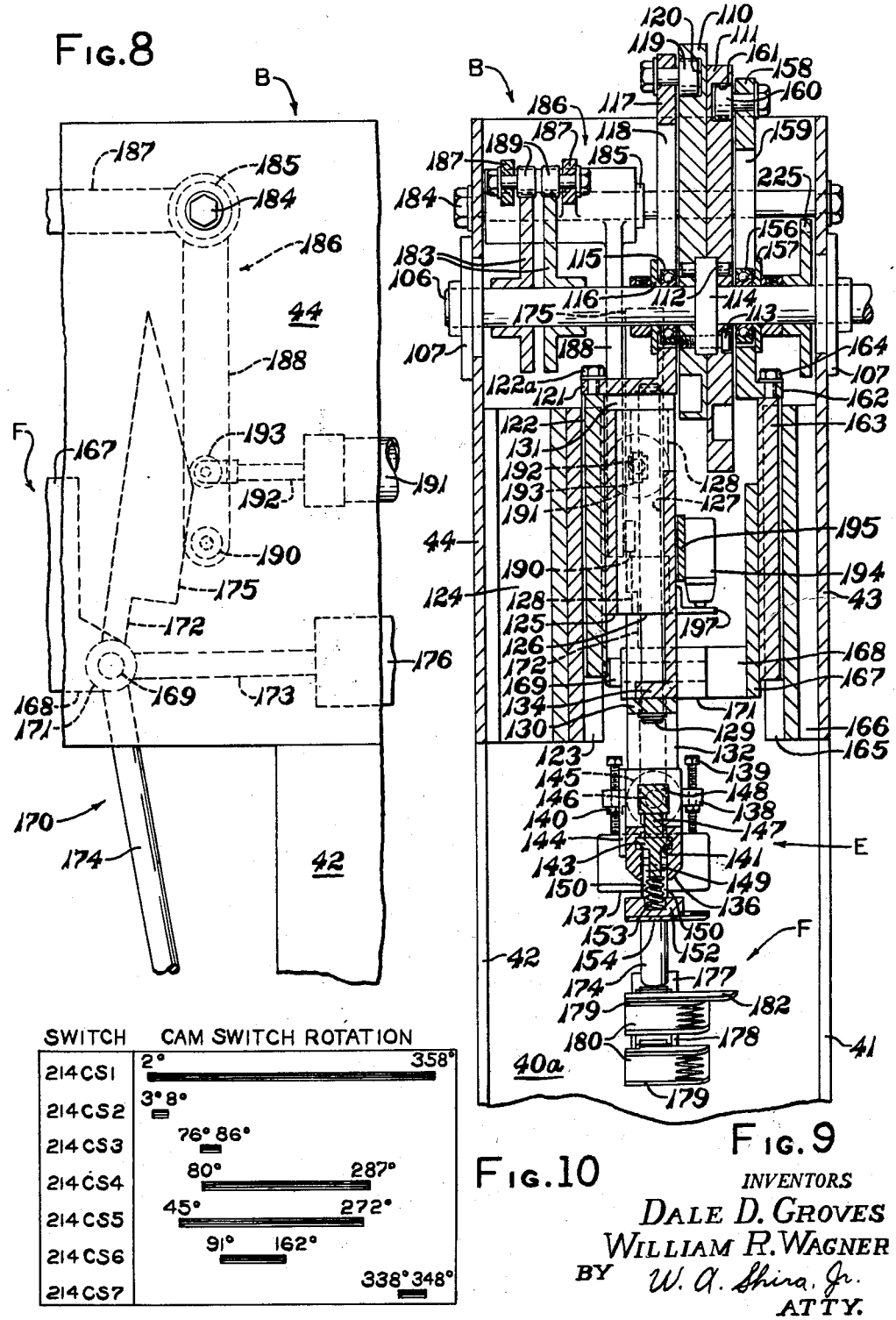

United States Patent Office 3,075,574
Patented Jan. 29, 1963

3,075,574
TIRE VENT TRIMMER
Dale D. Groves and William R. Wagner, Akron, Ohio, assignors to The B. F. Goodrich Company, New York, N.Y., a corporation of New York
Filed Oct. 26, 1960, Ser. No. 65,189
13 Claims. (Cl. 157—13)

This invention relates to a machine for removing unwanted protrusions from molded rubber articles, and, more particularly, to an improved apparatus for trimming mold rind and mold vent protrusions from inflatable vehicle tires.

Inflatable tires, particularly those types produced in large quantities for passenger and other vehicle use, are customarily vulcanized by the combined application of heat and pressure in sectional molds. As the tire is subjected to internal pressure in the mold, and the mold is brought to vulcanization temperature, the rubber tread and sidewall stocks flow until they have assumed the mold's internal conformation. To facilitate this flow and insure that all portions of the mold are completely filled by the rubber, each section of the mold is provided with a plurality of small openings, or vents, designed to exhaust entrapped air. During the molding operation excess rubber flows into these vents and into the interface between the mold sections. Therefore, upon removal from the mold the vulcanized rubber is covered with a plurality of vent protrusions, as well as a radially projecting skin, or rind, about the circumference of the tread.

In order to remove such protrusions and rind it has been customary in the past to rotate the tire in an upright position by means of driven, hourglass shaped rolls, which also supported the tire as trimming knives were brought into contact with the tread and sidewall. These knives have heretofore either been simply held in the hands of the operator, or when mechanized trimming has been attempted, the knives have been supported at the ends of arms movably operated on the frame of the apparatus. With the necessity for high speed trimming in modern tire production, it became impossible to trim the tires satisfactorily with any degree of consistency by these expedients, since the hourglass roll supports were unable to prevent tire wobble and jump at the tire rotational speeds necessary, thus leading to gouging and disfigurement of the tire by the trimming knives.

The principal object of this invention, therefore, is to provide an improved apparatus which will perform a more rapid trimming operation on the tread and sidewalls of an inflatable vehicle tire, the apparatus being so constructed and arranged that the cutting tools incorporated in the machine will not gouge and disfigure the tread and sidewall surfaces of the tire.

Another object of this invention is to provide an improved apparatus for performing a trimming operation on the tread and sidewalls of an inflatable vehicle tire characterized in that the apparatus rotatably centers, grips and inflates the tire, preventing rotational vibration and wobbling so as to prevent gouging and disfigurement of the tread and sidewall surfaces of the tire by the cutting tools engaged with the tire.

An additional object of this invention is to provide an improved apparatus as defined in the preceding paragraph wherein the tire is so gripped that the tire sidewalls become generally flattened in planes approximately perpendicular to the axis of the gripped tire to facilitate their trimming.

A further object of the invention is to provide an improved apparatus as defined in the preceding paragraph wherein the cutting tools are so constructed and arranged that they conform to the approximate contour of the tire surface when brought into contact therewith.

A still further object of this invention is to provide an improved apparatus as defined in the preceding paragraph, provided with sidewall and tread trimming tools so interconnected that the operative position of the tread trimming tools automatically controls the positioning of the sidewall trimming tools beneath the shoulder of the tread to prevent gouging of the edges of the tread.

Figure 11:
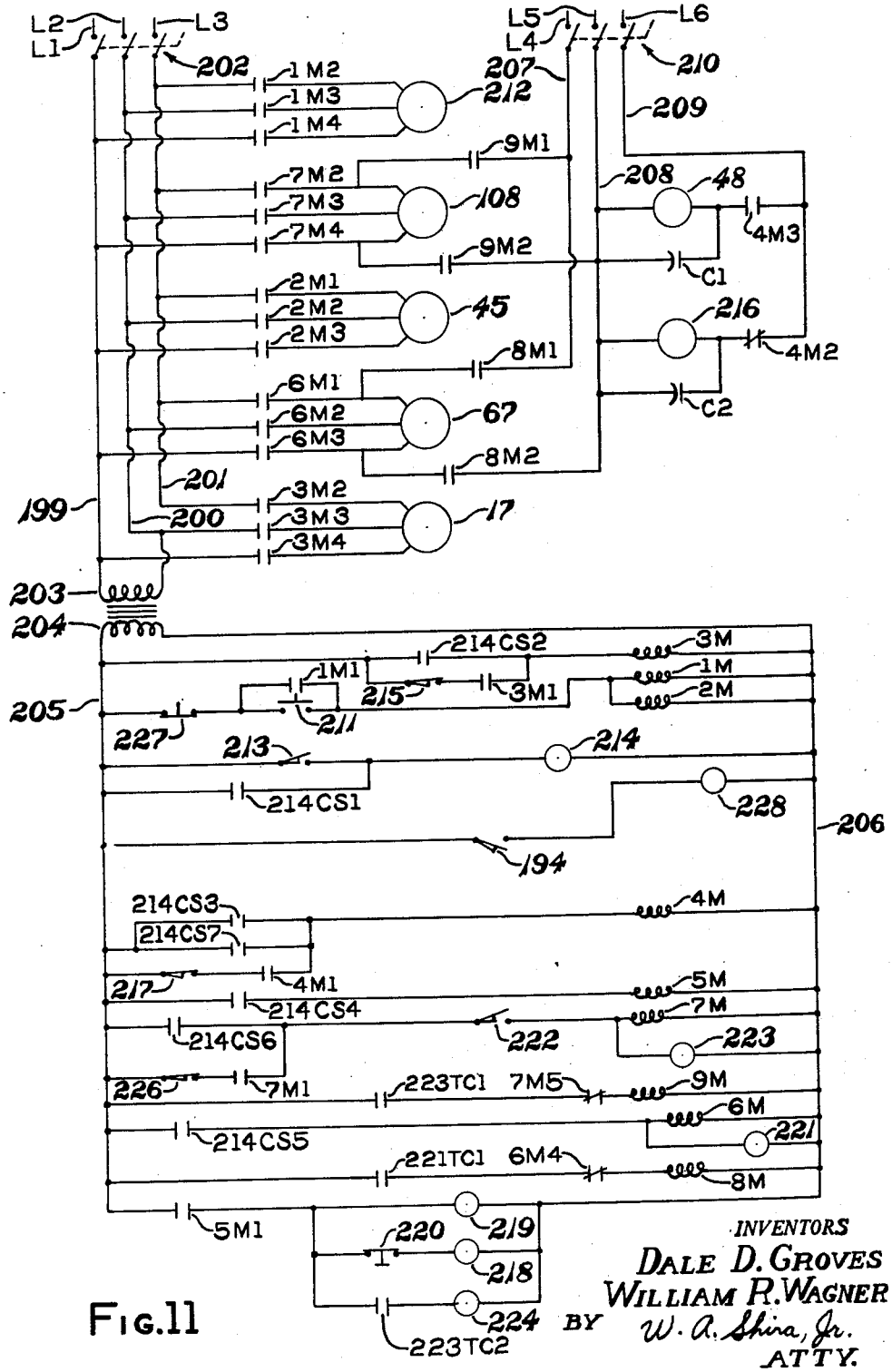

The invention further resides in certain novel features of the construction and in the combination and arrangement of the apparatus parts, and further objects and advantages of the invention will be apparaent from the following description of the presently preferred embodiment described with reference to the accompanying drawings, forming a part of this application, in which:

FIG. 1 is a side elevational view of the apparatus;
FIG. 2 is a detached rear elevational view of the tire centering mechanism, showing its position relative to the frame of the apparatus, which is indicated in phantom;
FIG. 3 is a detached side elevational view of the tire centering mechanism shown in FIG. 2, with portions thereof cut away;
FIG. 4 is a rear elevational view, with portions removed and others shown partially in section, showing the tire gripping, inflation and rotating mechanism, together with the tread and sidewall cutting tools, as viewed from the left side of FIG. 1;
FIG. 4a is a fragmentary portion of FIG. 4 to an enlarged scale showing the position of the resilient tire gripping linkage when the tire is gripped and inflated;
FIG. 5 is a side elevational view of the tire gripping and rotating mechanism shown in FIG. 4, a portion of the housing being removed to more clearly show the mechanism;
FIG. 6 is an enlarged fragmentary rear elevational view of the upper portion of the apparatus illustrated in FIG. 4, showing the relative positions of the tire, and the tread and sidewall cutting tools when the latter are in their raised positions;
FIG. 7 is a view similar to FIG. 6, but showing engagement of the tread and sidewall cutting tools with the tire surfaces;
FIG. 8 is a fragmentary front elevational view to an enlarged scale of one of the arms for the sidewall cutting tools prior to cutting tool engagement with the tire;
FIG. 9 is a fragmentary view, partially in section and partially in side elevation, showing the tread and sidewall cutting tool actuating mechanism to an enlarged scale;
FIG. 10 is a time chart indicating the closure times for the various cam switches in the operating control circuit; and
FIG. 11 is an across-the-line schematic wiring diagram of the electrical circuit for the apparatus.

General Arrangement

The presently preferred form of the apparatus embodying this invention is illustrated in the drawings as an auotmatic tire sidewall and tread trimimng machine 10. In a machine of this type, as shown in FIG. 1, inflatable vehicle tires, such as 11, having a plurality of mold vent protrusions 12, are brought to the machine and loaded on a conveyor A by means not shown. The conveyor A moves the tires 11 progressively through the machine 10 until each tire reaches the trimimng station B where it drops a short distance onto a platform 15a. The tire 11 is raised from the platform 15a and approximately centered in trimming position by means of a tire centering device C. When so located, the tire 11 is accurately centered, rotatably gripped and inflated by tire gripping and inflation mechanism D, centering device C disengaging the tire 11 at this time. The tire 11 is now rotated and a tread trimming assembly E and sidewall tirmming assembly F, see FIGS. 4, 6 and 7, are brought into trimming engagement with the tire to effectively trim the mold rind and vent protrusions 12 from the sidewalls and tread of the tire 11. Following the trimimng operation, the tire gripping and inflation mechanism D disengages the tire 11, allowing it to again drop onto the platform 15a, from which it is removed by the conveyor A and replaced by another untrimmed tire.

*Conveyor System*

The conveyor system A is supported upon a plurality of spaced vertical stanchions 13, to which are attached longitudinally extending lateral guide rails 14 and tire conveyor channels 15. Near the exit end of the conveyor A a motor platform 16 is mounted on and between pairs of stanchions 13. On the platform 16 are mounted a conveyor drive motor 17 and a speed reducer 18, to which the motor 17 is connected by means of a shaft coupling 19. On opposite ends of the output shaft 20 of the reducer 18 are mounted drive sprockets 21.

At the tire inlet end of the conveyor A a pair of horizontal slide guides 22 are mounted between pairs of stanchions 13. Slidably mounted between the guides 22 are slide members 23. A shaft 24 is rotatably mounted in journals 25, mounted on slide members 23. The journals 25 are provided with threaded horizontal shafts 26, which pass through vertical brackets 27 secured to the guides 22. Nuts 28 are screwed on the threads 29 of threaded shafts 26 and bear against brackets 27. On opposite ends of shaft 24 are mounted tension sprockets 30. On stanchions 13, more centrally located in the conveyor A, are mounted bearing blocks 31, in which are journalled idler sprockets 32.

A pair of parallel endless conveyor chains 33 pass about drive sprockets 21, tension sprockets 30, and idler sprockets 32. Mounted on these chains 33 are opposed pairs of brackets 34, between which are rotatably mounted concave conveyor rolls 35. The tension on chains 33 may be altered by adjusting the threaded nuts 28 on threaded shafts 26.

*Tire Centering, Mounting and Inflating Mechanism*

The tire centering, mounting and inflation operations are performed by two somewhat distinct, but nevertheless cooperative assemblies, namely, the tire centering device C and the tire mounting and inflating assembly D, both of which constitute a portion of the trimming station B.

The frame of trimming section B comprises a pair of sub-base plates 36. Mounted on the sub-base plates 36 is a motor stand 37 and vertical supports 38. Mounted on the upper ends of vertical supports 38 is an upper base plate 39. Also mounted on the sub-base plates 36 are the main vertical side supports 40, the main vertical front supports 41 and the main vertical rear supports 42. Mounted between the front and rear supports, 41 and 42 respectively, is the platform 15a. Mounted at the upper end of the main vertical rear supports 42 and between vertical side supports 40 is a rear cross frame member 44. Likewise, a front cross frame member 43 is mounted on the upper end of the vertical front supports 41 and between the vertical side supports 40. Mounted to either side of the platform 15a and between front supports 41 and rear supports 42 are the inner vertical supports 40a.

The mechanism drive motor 45 is mounted on the motor stand 37 and is connected to a gear reducer 46 by means of a shaft coupling 47, the gear reducer 46 being mounted on the upper base plate 39. Gear reducer 46 is connected by means of an electrical clutch 48, shown schematically in FIG. 11, to a second gear reducer 49, also mounted on base plate 39, two gear reducers being used in this apparatus to obtain the necessarily low output rotational speed. Crankshaft bearings 50 mounted on the main vertical front support 41 and rear support 42 journal a crankshaft 51, which is connected to the reducer 49 by means of a shaft coupling 52. Mounted between vertical side supports 40 and 40a are a pair of axially opposed bearing sleeves 53, in which are slidably mounted non-rotatable sliding shaft support members 54. Journalled in the support members 54 are a pair of axially opposed shafts 55. At the inner end of each shaft 55 is mounted a hub 56, to which is mounted a tire gripping chuck member 57.

The chuck members 57 are moved to and from engagement with a tire 11 by means of rotation of crankshaft 51, which is operatively connected to shaft support members 54 to effect axial movement of the latter. This connection includes crank links 58, each comprising an elongated rod portion 58a, one end of which is movably connected to shaft 51 by means of split collars 59. At the opposite end of each portion 58a is mounted a slide box 58b in which a slide member 58c is mounted for reciprocating movement in the direction of the axis of the rod portion 58a. On one end of the member 58c is mounted a rod 58d which protrudes through an opening 58e in the outer wall of slide box 58b and an opening 40b in the support 40 and has a threaded portion 58f at its outer end. A heavy compression spring 58g is held in place about rod 58d and compressed against the outer face of box 58b by means of a retaining washer 58h and lock nuts 58j mounted on the threaded portion 58f of rod 58d. Thus, the slide members 58c are normally held to the limits of their outward travel in slide boxes 58b. Each slide member 58c is pivotally connected to the lower end of a lever 60. The levers 60 are pivotally mounted on supports 61, which are mounted between vertical front and rear supports 41 and 42, respectively. The upper ends of levers 60 are bifurcated and engage pins 62, which are mounted on shaft support members 54 and protrude through slotted openings 63 in bearing sleeves 53. Rotatably mounted on the outer end of one of the bearing sleeves 53 is a sheave 64, which is slidably keyed to the shaft 55 by means of an elongated keyway 65 in shaft 55, provided with a key 66 that is fixed in hub 64a of the sheave 64. A chuck drive motor 67, having a drive sheave 68, is mounted on one of the vertical front supports 41, and the adjacent shaft 55 is driven from motor 67 by means of a plurality of endless drive belts 70, which pass about sheaves 64 and 68.

As seen in FIG. 4, each of the shafts 55 has an axial passageway 71 for conducting fluid under pressure, from external sources not shown, to a tire 11 mounted on chuck members 57 in order to inflate the tire thereon, so that the tire 11 presents a firm trimming base for the trimming assemblies E and F. One of the shafts 55 is connected to a source of low pressure air by means of a flexible hose line 55a attached to the shaft 55 by means of a rotatable coupling 55c. The other shaft 55 is connected to a source of high pressure air by means of a flexible hose line 55b connected to its shaft 55 by means of a rotatable coupling 55d. Located in line 55a is a pressure sensitive switch 220 for actuation of a solenoid valve 218, as hereinafter described, to shut off flow in line 55b when the pressure in the tire 11 and line 55b reaches a predetermined value.

With particular reference to FIGS. 2 and 3 it will be seen that the base plate 39 has a pivot bracket 72 mounted thereon, which pivotally supports one end of a lever arm 73. At an intermediate point along lever arm 73 a cam follower 74 is rotatably mounted. Beneath platform 15a a single acting air cylinder 75 is pivotally mounted thereto, with a retracting piston rod 76 of the cylinder pivotally connected to the lever arm 73, thereby normally urging the cam follower 74 against a cam 77 mounted on crankshaft 51 when air is introduced to the cylinder 75. The free end of lever arm 73 has a gear segment 78 mounted thereon.

Journalled in bearings 79, mounted on vertical supports 41 and 42, is a shaft 80. Mounted on shaft 80 is a circular gear 81, which is engaged with gear segment 78. A drive sprocket 82 is also mounted on shaft 80. A second shaft 83, axially parallel to shaft 80 in the same horizontal plane, is journalled in bearings 84 mounted on vertical supports 41 and 42. A sprocket 85 is mounted on shaft 83 and is operatively connected to the sprocket 82 on shaft 80 by means of a drive chain 86, which passes about both sprockets 82 and 85. Tension is imposed on chain 86 by means of idler sprocket 87, which is rotatably mounted on base plate 39 by means of an angled bracket 88.

Slidably mounted on vertical supports 41 and 42 are two pairs of upper roll support members 89 and lower roll support members 90. Horizontally mounted between the upper ends of each pair of support members 89 is a shaft 91. Rotatably mounted on each shaft 91 is a roller 92, having an enlarged, concave tire cradling portion 93 and a pair of opposed frusto-conical flanges 94. The pairs of roll support members 89 are joined for purposes of assembly rigidity by means of horizontal braces 95. Horizontally mounted between brackets 96, mounted on the central portion of each lower support member 90, are cross rods 97. Cross rods 97 are joined by a pair of parallel, inverted, shallow U-shaped roll support brackets 98. Mounted between adjoining upper ends of brackets 98 are roll support shafts 99, on which are rotatably mounted concave tire cradling support rolls 100. Also mounted on each shaft 99 and adjacent the ends of rolls 100 are a pair of opposed frusto-conical flanges 101, rigidly fixed thereto and having a sector, as at 102, removed therefrom to provide clearance with respect to platform 15a and vertical supports 41 and 42 when the flanges are in their lowered position.

The lower ends of each of the upper and lower roll support members 89 and 90, respectively, are provided with gear racks 103, which are held in engagement with four pinion gears 104, two of which are mounted on shaft 80 and the other two of which are mounted on shaft 83, by means of retaining slide guide brackets 105 mounted on vertical supports 41 and 42. Thus, as crankshaft 51 is rotated from its position shown in FIG. 2, first forcing lever arm 73 downward and then allowing air cylinder 75 to pull it upwards, rolls 93 and 100 are moved first away from one another and then toward one another, respectively.

Tire Trimming Assemblies

With particular reference to FIG. 9, the tread trimming assembly E and sidewall trimming assembly F are simultaneously lowered to their respective trimming positions shown in FIG. 7 by means of a cam shaft 106, which is journalled in bearings 107, mounted on front and rear cross frame members 43 and 44. Cam shaft 106 is rotated by means of a motor 108, which is supported on a motor bracket 109 mounted on cross frame member 43, see FIG. 1. Mounted on cam shaft 106 is a tread trimmer cam 110 and a sidewall trimmer cam 111, which cams are held in fixed relationship to one another by means of dowel pins 112 and bolts 113, which also pass through a cam positioning hub 114 mounted on shaft 106.

Mounted on shaft 106 adjacent to trimmer cam 110 is a bearing 115, held in position by means of a retaining flange 116 also mounted on shaft 106. Movably mounted on bearing 115 is a yoke 117 provided with a slot 118, in which bearing 115 is engaged. Thus, yoke 117 is limited to movement in a direction perpendicular to the axis of shaft 106. Rotatably mounted on the upper end of yoke 117 is a cam follower 119 engaged with a cam track 120, milled in the outer face of the tread trimmer cam 110, to lower and raise yoke 117 as cam shaft 106 is rotated. The yoke 117 has a foot portion 121, to which is attached a dovetail slide member 122 by means of bolts 122a. The slide member 122 is slidably mounted in a dovetail slideway 123 spaced from cross frame member 44 by and mounted on a spacing member 124, which is mounted on cross frame member 44. Thus, by the positive connection of the parts of this portion of the tread trimming assembly E the vertical movement of slide member 122 is positively controlled.

In order to accommodate the apparatus to tires of various diameters without a complete replacement of parts each time the diameter is changed, the tread trimming assembly E must be so constructed that it will automatically compensate for such changes. This is accomplished by having the portion of the assembly E containing the actual trimming components slidably mounted on the slide member 122 so that once the trimming components contact the tire 111, the slide member 122 and the portions of the assembly E positively connected thereto may continue their descent unrestrainedly.

Mounted on slide member 122 is a vertical plate 125 having a rectangular, vertical slideway block 126 positioned to either side thereof, see FIGS. 6 and 7. Each slideway block 126 has av ertical circular passageway 127 centrally located therein. At each end of each slideway block 126 passageway 127 is countersunk to receive a bearing sleeve 128 press fitted therein. Vertically and slidably mounted in the bearing sleeves 128 of each slideway block 126 is a slide rod 129, having a length somewhat longer than that of the block 126. The slide rods 129 are each joined at their lower ends by a horizontal brace 130, the ends of which extend a short distance beyond the sides of the rods 129. To the upper end of each slide rod 129, and normally resting on the upper end of the respective slideway block 126, and projecting beyond the edge thereof, is mounted a short horizontal brace 131. Mounted between the outer ends of brace 130 and brace 131 is a vertical member 132, which extends downward beyond the end of brace 130 to provide supoprt for the tread trimming tools.

Additional bracing is provided for the vertical members 132 midway of their length by means of a horizontal brace 133, seen only in FIGS. 6 and 7. An angle member 134 is mounted on the upper surface of horizontal member 130 and fits between the two slideway blocks 126, its purpose being merely to serve as additional weight, forcing the tread trimming assembly E downward under the force of gravity.

Pivotally mounted between the lower ends of vertical members 132 by means of bolts 135 is a horizontal block 136 having a rectangular adjusting block 137 mounted at each end thereof. Mounted on the inner side of each of the vertical members 132 and above adjusting blocks 137 are adjusting screw support brackets 138, each having a pair of adjusting screws 139 mounted therein for engagement with the upper surfaces of adjusting blocks 137. The screws 139 may be so adjusted to hold blocks 137 in the desired angular position. Lock nuts 140 are provided on each screw 139 to prevent their movement during machine operation. Block 136 has formed in its central portion, and extending from one end to the other, a slideway 141.

A slotted opening 142 is cut from the upper surface of block 136 to the slideway 141. Slidably mounted in slideway 141 is a slide member 143. Vertically mounted on one side of block 136 is a support plate 144, on which is supported a reciprocating air motor 145, having a piston rod 146. Piston rod 146 is connected to slide member 143 by means of a first connecting block 147, which passes through the opening 142 in block 136, and a second connecting block 148 mounted on the end of piston rod 146 and also mounted on the upper end of connecting block 147. Slide member 143 has a pivot bracket 149 depending from the center of its lower face, to which two pairs of toggle arms 150 are pivotally and jointly mounted by one of their ends. An outer trimming blade holder 151 is pivotally mounted on the other end of each of said pairs of toggle arms and a center trimming blade holder 152 is pivotally mounted by its outer edges to the inner edges of outer trimming blade holders 151. Each of the outer blade holders 151 and the center blade holder 152 have mounted therein serrated tread trimming blades 154. The center blade holder 152 is held in a normally lowered position relative to the outer blade holders 151 by means of a spring 153, which is mounted between the upper surface of center blade holder 152 and the lower surface of pivot bracket 149, as best seen in FIGS. 6 and 7.

The sidewall trimming assembly F is lowered and raised, respectively, to and from trimming position by cam means, similar to those effecting lowering and raising of the tread trimming assembly E. As shown in FIG. 9, the shaft 106 is provided with a bearing 156, held in position by means of a retaining flange 157, which is also mounted on shaft 106. Movably mounted on bearing 156 is a yoke 158, provided with a vertical slot 159, in which the bearing 156 is engaged, thus limiting the yoke 158 to movement in a direction perpendicular to the axis of shaft 106. Rotatably mounted on the upper end of yoke 158 is a cam follower 160, engaged in a cam track 161 milled on the outer face of the sidewall trimming cam 111, to lower and raise yoke 158 as cam shaft 106 is rotated. Yoke 158 has a foot portion 162, to which is attached a dovetail slide member 163 by means of bolts 164. The slide member 163 is slidably engaged in a dovetail slideway 165, which is spaced from crosshead member 43 by and mounted on a spacing web 166, which is mounted on the inner face of cross frame member 43. Mounted on slide member 163 is a pivot plate 167, having a pair of laterally opposed pivot ears 168. Pivotally mounted on each of the ears 168, by means of bolts 169, is a trifurcated member 170, see FIGS. 6 and 7, comprising a central mounting hub 171, an upper arm 172, a center arm 173 and a lower arm 174. Upper arms 172 have the outer ends thereof formed as cams 175. Slidably mounted on each center arm 173 are counterweights 176, increasing the normal tendency of arm 172 to rotate downward. Slidably mounted near the outer ends of each of the lower arms 174 is a clevis 177. Pivotally mounted in clevis 177 is a double clevis 178. Pivotally mounted in each double clevis 178 are a pair of trimming blade holders 179, each of which has a trimming blade receiving channel 180. On the side facing the tire 11 and engaged in each channel 180 is a serrated sidewall trimming blade 181. The upper holder 179 in each pair of holders has a guard runner 182 mounted on its inner edge to prevent tire gouging when the blades 181 are brought into trimming engagement with the tire 11. The double clevis mounting of the blades 181 allows them to more closely and freely follow and conform to the contours of the sidewalls of the tire 11.

Mounted on cam shaft 106 are a pair of identical cams 183. Rotatably mounted between cross frame members 43 and 44 by means of bolts 184 and bearings 185 are a pair of bifurcated cam follower members 186, each having one approximately horizontal arm 187 and one approximately vertical arm 188. On the outer ends of each of the arms 187 are mounted cam followers 189, each engaged with one of the cams 183. On the lower end of each of the arms 188 is mounted a rotatable cam follower 190, which is normally engaged with the cam 175 on the trifurcated member 170. Thus, during the initial lowering of the sidewall trimming assembly F, the trimming knives 181 are caused to be held away from the tire because of the fact that the cam followers 190 engaged with the cams 175 prevent rotation of the trifurcated members 170.

Mounted between cross frame members 43 and 44, by means not shown, are a pair of axially opposed singleacting air cylinders 191 having piston rods 192. The piston rods 192 have cam followers 193 rotatably mounted on their outer ends and are normally in their extended position for engagement with cams 175 on trifurcated members 170, see FIG. 7, to prevent sudden engagement with the tread shoulder or sidewall of the tire 11 by the sidewall trimming knives 181 when the cam followers 190 disengage cam surfaces 175.

Cam cylinders 191 are caused to retract their piston rods from cams 175, allowing the sidewall trim blades 181 to come into trimming contact with the sidewalls of the tire 11, by actuation of a limit switch 194. Switch 194 is mounted on a bracket 195, which in turn is mounted on horizontal brace 133 of the tread trimming assembly E. When the tread trimming assembly E is in a raised position, as seen in FIGS. 6 and 9, limit switch 194 is held in open circuit depressed condition by contact with an angle member 197 mounted on the lower end of one of the slideway portions 126 of the slide guide member 125. As previously described, the tread trimming assembly E is so constructed that it will automatically compensate for changes in tire diameters passing through the apparatus, by having the portion of the assembly E containing the actual trimming components slidably mounted on the slide member 122, so that once the trimming blades 154 contact the tire 11 the slide member 122 and the portions of the assembly E positively connected thereto may continue their descent. Limit switch 194 is mounted on that portion of the assembly E containing the actual trimming components and the angle member 197 is mounted on the portion of the assembly E which is connected to the tread trimming cam 110. When the tread trimming assembly E is lowered and makes contact with a tire tread, the limit switch 194 then ceases to move downward while the angle member 197 continues downward away from it, allowing the switch 194 to close the electrical circuit in which it is located. A solenoid 228 in series with limit switch 194 is thus energized to operate a valve, not shown, admitting air to the air cylinders 191, causing cam followers 193 to be retracted from cams 175, allowing the trifurcated members 170 to partially rotate until the sidewall trimming knives 181 are in contact with the tire sidewall. By having the limit switch 194 responsive to tread trimming contact by the assembly E, the sidewall trimming assembly F likewise compensates for changes in tire diameters passing through the apparatus.

Control Circuit and Machine Operation

The control circuit for governing the motor and operative mechanism of the machine 10 is principally operated by alternating current. Subordinate interconnected motor braking and shaft clutching and braking circuits are operated by a direct current, as shown in FIG. 11. It is to be understood that the conventional devices such as current limiting resistances, overload devices, grounds and the like have been omitted for the sake of clarity in presentation.

It will be seen that alternating current power is supplied to the circuit through power supply lines L1, L2 and L3, which are connected to a source of electrical energy of the 3-phase alternating current type. The power lines L1, L2 and L3 are connectable to the main motor circuit lines 199, 200 and 201, respectively, through a triple pole, single throw disconnect switch 202. Lines 199 and 200 are connected to the primary coil 203 of a stepdown transformer. Secondary coil 204 of this transformer has its terminals connected to power supply lines or bus bars 205 and 206 for the control circuit.

Direct current power for the motor braking circuit is supplied to the circuit through power supply lines L4, L5 and L6, which are connected to a source of electrical energy of the direct current type in such a way that the electrical potential between lines L4 and L6 is twice that between L4 and L5, thus creating two distinct but interconnected direct current circuits. The power lines L4, L5 and L6 are connectable to the braking and clutching lines 207, 208 and 209, respectively, through a triple pole, single throw disconnect switch 210.

The electrical circuit of the apparatus will be readily understood from the following detailed description of the operation of the apparatus as a whole.

The operator commences operations by throwing disconnect switches 202 and 210 to energize the main motor circuit, control circuit and the clutching and braking circuit. He then depresses start switch 211, which energizes relays 1M and 2M. The energization of relay 1M closes its contacts 1M1 to effect a holding circuit around start switch 211. Hence, relays 1M and 2M remain energized after the operator releases start switch 211. Energization of relay 1M also closes its contacts 1M2, 1M3 and 1M4, causing motor 212 to operate. Motor 212 actuates a reciprocating valve, not shown, for the creation of pulsating fluid pressure waves in the pressure feed line of the reciprocating air motor 145 when air is supplied through the line as hereinafter described. The energization of relay 2M closes its contacts 2M1, 2M2 and 2M3, causing crankshaft drive motor 45 to operate.

As an incoming, untrimmed tire 11 drops on the conveyor channel 15 at the entrance end, a limit switch 213 mounted thereon is momentarily closed by the falling tire to actuate cam switch motor 214, which has seven switch timing cams on its shaft, not shown. The preferred relative closure times for all of the timing cams are seen in FIG. 10. The first few degrees of rotation of the cam shaft of motor 214 causes the switch contacts 214CS1 to close, to effect a holding circuit about limit switch 213 thereby continuing operation of the motor 214 after switch 213 returns to its normally open position.

Continued rotation of the shaft of motor 214 causes the switch contacts 214CS2 to be closed momentarily, energizing relay 3M. Energization of relay 3M closes relay contact 3M1, which effects a holding circuit about switch contacts 214CS2 thus maintaining energization of relay 3M. Energization of relay 3M also effects closure of relay contacts 3M2, 3M3 and 3M4 to energize the conveyor drive motor 17 and thereby advance a tire 11 to the trimming station B.

As a tire 11 reaches the trimming station B and drops down to platform 15a, a lug, or other suitable engagement means not shown, mounted on one of the conveyor chains 33 engages and momentarily opens a limit switch 215, interrupting current to relay 3M, which opens contacts 3M1, 3M2, 3M3 and 3M4, stopping conveyor drive motor 17. Hence, the tire 11 is retained at the trimming station B.

Cam switch contacts 214CS5 are now closed by further rotation of the shaft in cam switch motor 214 to energize timer 221 and relay 6M. Energization of relay 6M closes its contacts 6M1, 6M2 and 6M3. Thus, current is supplied to the chuck drive motor 67. Energization of relay 6M also opens its relay contact 6M4 to prevent energization of relay 8M which, when energized, supplies direct current to the windings of chuck drive motor 67. Energization of the timer 221 closes its relay contact 221TC1.

Continued rotation of the shaft in cam switch motor 214 causes cam switch contacts 214CS3 to close momentarily, energizing relay 4M to close its contacts 4M1 and 4M3 and open contacts 4M2. Closure of contacts 4M1 effects a holding circuit about cam switch contact 214CS3 to maintain energization of relay 4M. The opening of contact 4M2 de-energizes and releases an electric brake 216, which normally prevents crankshaft 51 from rotating. The closure of contact 4M3 energizes an electric clutch 48 to operatively connect the output shaft of the first reducer 46 to the input shaft of the second reducer 49, thus allowing crankshaft 51 to rotate in response to rotation of the shaft in the motor 45. C1 and C2 are discharge capacitors for the electric clutch 48 and the brake 216, respectively.

Rotation of the crankshaft 51 and the cam 77 attached thereto through 90 degrees to their positions shown in FIG. 2 allows lever arm 73 to be raised by action of the air cylinder 75, thus rotating shaft 80 by engagement of the gear segment 78 with spur gear 81. The shaft 83 rotates simultaneously with shaft 80 by means of movement of the connecting drive chain 86. Thus, the four pinion gears 104 are rotated in the same direction to simultaneously raise the lower roll support members 90 and lower the upper roll supports 89 and the tire cradling rolls 100 and 93 attached thereto, respectively. By virtue of the positive drive effected by the rack gears 103 with the pinions 104 the cradling rolls 93 and 100 are kept at all times equidistant from the axis of the tire chuck members 57. As the crankshaft 51 rotates through another 90 degrees, and just before chucks 57 engage the tire, rolls 93 and 100 disengage the tire and start to return to their respective starting positions, freeing the tire for engagement by the chucks 57, which, at the end of 180 degrees of rotation of crankshaft 51, fully engage the tire.

A dog, not shown, mounted on reducer coupling 52, engages a normally closed limit switch 217 after 180 degrees rotation of the crankshaft 51. Opening of the limit switch 217 causes relay 4M to be deenergized. The de-energization of relay 4M opens its relay contacts 4M1 and 4M3 and closes relay contact 4M2, thus braking the crankshaft 51 at that point.

As the shaft of cam switch motor 214 continues its rotation, cam switch contacts 214CS4 are closed. Closure of the contacts 214CS4 causes relay 5M to be energized. Energization of the relay 5M closes its relay contacts 5M1 to energize the solenoid air valves 218 and 219, which admit high pressure air to the axial passageway 71 in one of the shafts 55 and low pressure air to the opposite passageway 71. The sudden rush of a large volume of high pressure air causes the sides of the tire 11 to snap outward quickly into fluid pressure sealing engagement with the flanges 57a of the chucks 57. As the pressure within the tire increases, the chucks 57 are forced outward causing levers 60 to partially rotate in a direction which forces the slide members 58c to move inwardly in slide boxes 58g thereby compressing springs 58g. When the pressure within the tire reaches a predetermined value, the tire sidewalls become flattened in a plane approximatey perpendicular to the axis of the tire 11, and a pressure-sensitive switch 220 in the low pressure airline 55a opens to de-energize solenoid valve 218 in the high pressure airline 55b, cutting off the flow of high pressure air, pressure in the tire being maintained from the source of low pressure air.

A normally open limit switch 222 is connected in series with the cam shaft motor relay 7M and is closed only when the chucks 57 are moved inward, to prevent operation of the cam shaft drive motor 108 when the chucks 57 are in their outer position.

Further rotation of the shaft of cam switch motor 214 causes cam switch contacts 214CS6 to be closed to energize relay 7M and a timer motor 223. Energization of relay 7M causes relay contacts 7M1 to effect a holding circuit about cam switch contacts 214CS6. Energization of relay 7M also closes its contacts 7M2, 7M3 and 7M4 to start the cam shaft drive motor 108. The relay 7M also opens relay contact 7M5. Timer motor 223 causes its contacts 223TC1 and 223TC2 to close for a predetermined length of time. Closure of relay contacts 223TC2 actuates solenoid valve 224 located in the pressure feed line of the reciprocating air motor 145 between said motor and a reciprocating valve, not shown, operated by motor 212. Thus, the air motor 145 is subjected to pulsating fluid pressure, causing its piston rod 146 and attendant connected parts to reciprocate in a direction parallel to the axis of the mounted tire 11.

The operation of the cam shaft drive motor 108 causes cam shaft 106 to rotate in a clockwise direction, as viewed in FIGS. 6 and 7. After shaft 106 rotates through 360°, a timer cam 225 mounted on cam shaft 106, see FIG. 9, engages and opens a limit switch 226, shown only schematically in FIG. 11, and interrupts current to relay 7M, which cuts off electrical driving power to the cam shaft drive motor 108. As the cam shaft 106 does rotate, the cam followers 119 and 160 of the trimming assemblies F and E, respectively, are moved downward by the cam tracks 120 and 161, thus causing trimming assemblies E and F to be lowered.

As the sidewall trimming assembly F is lowered, cams 183 cause the vertical sections 188 of the bifurcated members 186 to move outward until their cam followers 190 disengage cam surfaces 175 of the trifurcated members 170. However, the sidewall knives 181 are prevented from moving further inward towards the tire by engagement of the cam surfaces 175 with cam followers 193, as seen in FIG. 7. This is to overcome the possibility of tread shoulder gouging by the knives 181. When the knives 181, in their downward movement, have cleared the tread shoulder and the tread knives 154 contact the tire tread, limit switch 194 is closed, which energizes the solenoid valve 228 to admit air to cylinders 191, retracting cam followers 193 and allowing sidewall knives 181 to come into trimming contact with the sidewalls of the tire 11.

By action of the cams 110 and 111, the sidewall knives 181 move downward following the contour of the tire 11 for a predetermined distance, depending upon the bead size of the tire being trimmed . The maximum travel of the knives 181 may be set by positioning the clevis 177 on the lower arm 174 of the trifurcated member 170. Having travelled this distance, the trimming assemblies E and F are raised by means of continued rotation of cams 110 and 111. The raising of the tread trimming assembly E again opens limit switch 194, de-energizing solenoid valve 228, which releases air from air cylinders 191 to extend cam followers 193. Cam followers 190 also are moved inward at approximately this same time to engage the cam surfaces 175 to provide positive holding of the trifurcated members 170. Thus the sidewall trim knives 181 are moved away from the tire sidewalls before they are dragged over the tread shoulder.

At the time the trimming knives 154 and 181 are raised from the tire 11, cam switch 214CS5 is again opened. Opening of this switch de-energizes relay 6M and timer 221. Thus, driving power for the chuck drive motor 67 is shut off and relay contacts 6M4 are again closed to energize relay 8M, which closes its relay contacts 8M1 and 8M2. Closing of the contacts 8M1 and 8M2 allows direct current to flow in the winding of the chuck drive motor 67, thus braking it electrically. After a predetermined time delay established by timer 221, relay contacts 221TC1 are opened. Opening of these contacts interrupts the direct current braking of cam shaft motor 108.

As cam 225 completes its 360 degrees of rotation and the tread and sidewall trimming assemblies E and F are fully raised, limit switch 226 is opened to de-energize relay 7M and timer motor 223. Relay contacts 223TC2 are opened a predetermined time after de-energization of timer motor 223, closing solenoid valve 224 and thus stopping transmission of pressure pulses to the air motor 145. De-energization of relay 7M opens its contacts 7M2, 7M3 and 7M4 to stop the cam shaft motor 108, opens its contacts 7M1 and closes relay contacts 7M5 to energize relay 9M. Energization of relay 9M closes its relay contacts 9M1 and 9M2 to provide direct current braking power to the field coils of the cam shaft motor 108. At a predetermined time after de-energization of timer motor 223, contacts 223TC1 are opened to interrupt the direct current braking force.

At this point cam switch 214CS4 is again opened to de-energize relay 5M, causing its attendant relay contacts 5M1 to open, which deactuates solenoid valves 218 and 219 and allows pressure switch 220 to again close.

Cam switch 214CS7 is now momentarily closed. This effects energization of relay 4M, closing its relay contacts 4M1, 4M3 and opening its relay contacts 4M2. The closing of contact 4M1 effects a holding circuit around cam switch 214CS7. The opening of contact 4M2 and closing of contact 4M3 disengages brake 216 and engages clutch 48 to rotate crankshaft 51 another 180 degrees to bring the chucks 57 away from the tire 11 and separate the tire centering rolls, thus allowing the tire to drop onto platform 15a again. After 180 degrees of rotation of crankshaft 51, limit switch 217 is again momentarily opened to de-energize relay 4M and brake crankshaft 51. A portion of the cam 77 has a constant radius so that its rotation during this period does not motivate the tire centering device C.

The apparatus has now been returned to its original electrical status in effect following the original depression of start switch 211 by the operator. The apparatus will continue to operate automatically as tires 11 are dropped onto the conveyor channels 15, with no attention necessary by the operator. The machine may be shut down by depressing stop switch 227, which de-energizes relays 1M and 2M to stop the motors 212 and 45, respectively.

Although the invention has been described with reference to a specific embodiment, it will be understood by those skilled in the art to which it pertains that modifications and refinements may be made thereto within the spirit and scope of the invention as defined in the appended claims.

We claim:

1. An apparatus for removing unwanted protuberances from a molded annular rubber article, the said apparatus comprising means to engage the periphery of an article and center it relative to an axis, supporting means movable along said axis and adapted to engage in the central opening of said article, means to rotate the supported article, a first knife means movable to and from engagement with the periphery of said supported article, other knife means movable to and from engagement with the sidewalls of said supported article, means for moving said other knife means generally radially and axially with respect to the supported article, and means to limit the axial movement of said other knife means until after a predetermined radial movement of said first knife means toward said article has been effected.

2. An apparatus for trimming unwanted protuberances from an inflatable vehicle tire, comprising means to centrally grip and inflate said tire with its axis extending horizontally, a tread cutting tool assembly supported above said supported tire for radial movement toward and away from the latter, a pair of sidewall cutting assemblies supported for joint radial translational and generally axial rocking movement toward and away from opposed sides of the tire, cam means operatively connected with said sidewall cutting assemblies to effect said radial movement thereof, and means to limit rocking movement of said sidewall cutting assemblies until after predetermined radial movement of said tread cutting tool assembly toward said tire.

3. Apparatus for trimming unwanted protrusions from an inflatable vehicle tire, comprising a pair of opposed support means to centrally grip and inflate said tire, means to engage the periphery of the tire and center it relative to said support means, means to move said support means to and from fluid pressure sealing engagement with a centered tire including means to allow said support means to move apart sufficiently following initial sealing engagement in response to inflation of said tire so that the sidewalls of tire inflated thereon are approximately flattened in planes perpendicular to the axis of said tire, means to rotate the said support means, a tread cutting tool, means to move said tread cutting tool to and from tangential contact with the tread of the gripped tire, sidewall cutting tools, and means cooperating with said last-mentioned means to bring said sidewall cutting tools to and from tangential contact with the side walls of the gripped tire.

4. Apparatus for trimming mold rind and mold vent protrusions from a vehicle tire; said apparatus comprising a frame; tire centering means, said tire centering means further comprising upper and lower support rolls movably supported on said frame for engagement with the periphery of a tire, and means for moving said lower and upper rolls toward and away from one another while maintaining said rolls equidistances from an axis; rotatable means on said frame to centrally grip and inflate said tire engaged by said upper and lower rolls with said tire's sidewalls flattened in planes perpendicular to said axis; means to rotate said tire gripping means and the inflated tire mounted thereon; tread trimming means suspended from said frame; means to lower and raise said tread trimming means, respectively, to and from tangential contact with the tread surface of said tire as it rotates, in timed relationship to operation of said centering means; and means to move said tire gripping means toward said tire in timed relationship to operation of said centering means, and to release said tire in timed relation to the operation of said trimming means.

5. Apparatus as defined in claim 4, wherein the said tread trimming means includes a support platform movably suspended from said frame, two outer knife holders, a toggle linkage interconnecting said knife holders to said support platform, a central knife holder pivotally mounted between said outer knife holders, means normally depressing said central knife holder to a position lower than that of said outer knife holders, and a serrated knife removably mounted in each of said knife holders.

6. Apparatus as defined in claim 4 wherein the said tread trimming means includes a support platform movably suspended from said frame, a pivot bracket slidably mounted on said platform, means mounted on said platform to impart oscillatory movement to the said pivot support, two pairs of toggle arms each pivotally and jointly mounted by one end to said pivot, two outer knife holders each pivotally mounted to the other end of one of said pairs of toggle arms respectively, a central knife holder pivotally mounted to each of said outer knife holders and a serrated knife removbaly mounted in each of said knife holders.

7. Apparatus as defined in claim 4, further comprising means to convey a tire to and from said frame, said conveying means comprising fixed means to support said tires in an approximately upright position and means to move tires over said fixed means, and means responsive to the outward movement of said tire gripping means and arrival of an untrimmed tire at the entrance end of said conveying means to effect actuation of the latter for moving said tires to and from said frame.

8. An apparatus for trimming unwanted protuberances from inflatable vehicle tires, comprising chuck means adapted to engage the central opening of a tire, means to sequentially convey tires to the vicinity of the said chuck means, means to center a conveyed tire relative to said chuck means, means to move said chuck means into gripping engagement with said centered tire, means to effect inflation of the gripped tire, a plurality of knives, means supporting certain of said knives for movement to and from engagement with the tread periphery of a gripped tire, means supporting other of said knives for movement to and from engagement with the sidewalls of a gripped tire, and means for sequentially operating said conveying, centering, chucking and knife supporting means in predetermined timed relationship.

9. Apparatus as defined in claim 8, wherein said means to move said chuck means into gripping engagement with said tire further comprises means supporting said chucks for coaxial movement toward and away from one another, and motion producing means including a yieldable portion connected to said chuck supporting means adapted to permit limited movement of said chucks away from each other to the extent the sidewalls of said tire so engaged are flattened in planes approximately perpendicular to the axis of said tire in response to the development of a predetermined air pressure in the supported tire.

10. Apparatus for trimming mold rind and mold vent protrusions from an inflatable vehicle tire, said apparatus comprising a frame, means to mount said tire on said apparatus with its axis disposed horizontally and its sidewalls approximately flattened in planes perpendicular to said axis, means to rotate said tire so mounted, a tread trimming tool movably suspended from said frame, means to lower and raise said tread trimming tool respectively to and from tangential contact with the tread surface of said gripped tire; a sidewall trimming assembly movably supported on said frame, said sidewall trimming assembly comprising a pair of rockable members each movably positioned to either side of the gripped tire, each of said rockable members including a movement limiting camming surface and a knife holding means provided with a protrusion trimming knife, cam means rotatably mounted on said frame, means to rotate said cam means in timed relationship to the lowering and raising of said tread trimming tool, and motion transmitting means intermediate the said cam means and the said camming surfaces on said rockable members to control rocking of the latter.

11. Apparatus for trimming mold rind and mold vent protrusions from a vehicle tire, said apparatus comprising a frame, rotatable means on said frame adapted to centrally grip and inflate said tire with its axis disposed in a horizontal position and its sidewalls approximately flattened in planes perpendicular to said axis, means to rotate said means to grip the tire and the inflated tire gripped thereby, a tread trimming tool assembly mounted for vertical movement on said frame, cam means to lower and raise said cutting tool assembly to and from cutting engagement with the tread surface of said tire, a sidewall cutting tool assembly mounted for vertical movement on said frame, cam means to lower and raise said sidewall cutting tool assembly to and from position for trimming the sidewall surface of said tires; said sidewall cutting tool assembly including a pair of members pivotally mounted for rocking movement to extend on opposite sides of the tire to be trimmed, a knife holder assembly supported on each of said pivotally mounted members, at least one trimming knife mounted in each of said knife holders; and means to control rocking of said pivotally mounted members to and from positions in which the knives thereon engage the tire including fluid pressure means engageable with a portion of each of said pivotally mounted members to normally prevent cutting engagement of said sidewall cutting tool assembly with the tire, and means responsive to the engagement of said tread cutting tool assembly with the said tread surface of said tire to actuate said fluid pressure means to a position allowing movement of said pivotally mounted members for cutting engagement of the knives thereon with the sidewalls of said tire.

12. Apparatus for trimming mold rind and mold vent protrusions from an inflatable vehicle tire; said apparatus comprising a frame; rotatable means on said frame adapted to centrally grip said tire with its axis disposed horizontally and its sidewalls disposed in planes approximately perpendicular to the said axis; means to rotate said means to grip the tire; means movably supported by said frame to center said tire coaxially with said rotatable means; a tread trimming tool assembly mounted for vertical movement on said frame; means to lower and raise said tread trimming tool assembly to and from trimming engagement with the tread surface of said tire; a sidewall trimming tool assembly mounted for vertical movement on said frame; means to lower and raise said sidewall cutting tool assembly to and from position for trimming the side wall surface of said tire; said sidewall cutting tool assembly including a pair of rockable members each movably positioned to either side of the gripped tire, each of said rockable members including a movement limiting camming surface and a knife holding means provided with at least one protrusion trimming knife, cam means rotatably mounted on said frame, means to rotate said cam means in timed relationship to the lowering and raising of said tread trimming tool, and motion transmitting means intermediate the said cam means and the said camming surfaces on said rockable members to control rocking of the latter; and fluid pressure means engageable with a portion of each of said pivotally mounted members to normally prevent cutting engagement of said sidewall cutting tool assembly with the said tire; and means responsive to the engagement of said tread trimming tool assembly with the said tread to actuate said fluid pressure means to a position allowing movement of said pivotally mounted members for cutting engagement of the knives thereon with the sidewalls of said tire.

13. Apparatus for trimming mold rind and mold vent protrusions from a vehicle tire, comprising a frame, means mounted on said frame to convey tires sequentially through the apparatus, a pair of upper tire cradling rolls movably mounted on said frame, a pair of lower tire cradling rolls movably mounted on said frame, a gear means connecting said pairs of upper and lower tire cradling rolls for movement toward and away from one another while maintaining said pairs of rolls equal distances from a given point, means rotatably mounted on said frame for gripping and inflating a tire, means for moving said gripping means into tire engagement operatively interconnected with said gear means to actuate said gripping means in timed relationship to operation of said gear means, tread cutting means and sidewall cutting means movably supported on said frame, and means operable in timed relationship to the movement of said tire gripping means toward said tire to initiate movement of said tread cutting means and sidewall cutting means to and from the tread and sidewall surfaces, respectively, of said tire.

References Cited in the file of this patent
UNITED STATES PATENTS

| | | |
|---|---|---|
| 2,524,489 | Strong | Oct. 3, 1950 |
| 2,581,928 | Broden | Jan. 8, 1952 |
| 2,603,290 | Lindemann | July 15, 1952 |
| 2,606,612 | Dinnan | Aug. 12, 1952 |
| 2,681,108 | Chanyi | June 15, 1954 |
| 2,695,520 | Karsai | Nov. 30, 1954 |
| 2,734,568 | Anderson | Feb. 14, 1956 |
| 2,815,073 | Wikle et al. | Dec. 3, 1957 |
| 2,866,500 | George et al. | Dec. 30, 1958 |
| 2,888,065 | Neilsen | May 26, 1959 |
| 2,924,255 | Robbins | Feb. 9, 1960 |
| 2,969,096 | Smyser | Jan. 24, 1961 |